US009714626B2

(12) United States Patent
Hatanaka et al.

(10) Patent No.: US 9,714,626 B2
(45) Date of Patent: Jul. 25, 2017

(54) DRIVE DEVICE FOR FUEL INJECTION DEVICE

(71) Applicant: Hitachi Automotive Systems, Ltd., Hitachinaka-shi, Ibaraki (JP)

(72) Inventors: Ayumu Hatanaka, Tokyo (JP); Ryo Kusakabe, Tokyo (JP); Motoyuki Abe, Tokyo (JP); Toshihiro Aono, Tokyo (JP); Teppei Hirotsu, Tokyo (JP); Hideyuki Sakamoto, Hitachinaka (JP); Takao Fukuda, Hitachinaka (JP); Hideharu Ehara, Hitachinaka (JP); Masahiro Toyohara, Hitachinaka (JP); Akira Nishioka, Tokyo (JP); Toshio Hori, Hitachinaka (JP); Kiyoshi Aiki, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 1 day.

(21) Appl. No.: 14/766,253

(22) PCT Filed: Jan. 24, 2014

(86) PCT No.: PCT/JP2014/051434
§ 371 (c)(1),
(2) Date: Aug. 6, 2015

(87) PCT Pub. No.: WO2014/123004
PCT Pub. Date: Aug. 14, 2014

(65) Prior Publication Data

US 2015/0377176 A1 Dec. 31, 2015

(30) Foreign Application Priority Data

Feb. 8, 2013 (JP) ................................ 2013-022807

(51) Int. Cl.
*F02M 51/06* (2006.01)
*F02D 41/20* (2006.01)
(Continued)

(52) U.S. Cl.
CPC .......... *F02D 41/401* (2013.01); *F02D 41/20* (2013.01); *F02D 41/3011* (2013.01);
(Continued)

(58) Field of Classification Search
CPC .... F02D 41/20; F02D 41/401; F02D 41/2006; F02D 41/2055; F02D 41/2058; F02D 41/3011; F02M 51/061; F02M 63/0017
See application file for complete search history.

(56) References Cited

U.S. PATENT DOCUMENTS 5,992,391 A * 11/1999 Yamakado .............. F02D 41/20 123/490
6,102,008 A 8/2000 Maeda et al.
(Continued)

FOREIGN PATENT DOCUMENTS

JP 58-211538 A 12/1983
JP 4-287850 A 10/1992
(Continued)

OTHER PUBLICATIONS

International Search Report (PCT/ISA/210) dated Apr. 28, 2014, with English translation (Four (4) pages).

*Primary Examiner* — Hieu T Vo
*Assistant Examiner* — Arnold Castro
(74) *Attorney, Agent, or Firm* — Crowell & Moring LLP

(57) ABSTRACT

An object of this disclosure is to provide a fuel injection device that can reliably detect an operation timing of a valve body, that is, a valve opening timing with high accuracy. The current of an electromagnetic valve reaches I2 at time t3, an FET 201 and an FET 221 are turned on, and a battery voltage
(Continued)

VB is applied to the electromagnetic valve until time t5 is reached. The amount of displacement of the valve body reaches a target amount of control lift at time t4 between time t3 and time t5, that is, a movable core 304 comes into contact with a fixed core 301. The detection of the valve opening timing is performed during the period from time t3 to time t5.

19 Claims, 13 Drawing Sheets

(51) Int. Cl.

| | |
|---|---|
| ***F02D 41/34*** | (2006.01) |
| ***F02M 51/00*** | (2006.01) |
| ***F02M 61/10*** | (2006.01) |
| ***F16K 31/06*** | (2006.01) |
| ***F02D 41/40*** | (2006.01) |
| ***F02D 41/30*** | (2006.01) |
| ***F02M 63/00*** | (2006.01) |

(52) U.S. Cl.
CPC ...... *F02M 51/061* (2013.01); *F02M 63/0017* (2013.01); *F02D 2041/2006* (2013.01); *F02D 2041/2055* (2013.01); *F02D 2041/2058* (2013.01)

(56) References Cited

U.S. PATENT DOCUMENTS 6,634,338 B1 * 10/2003 Yamakado .............. F02D 41/20 123/490
7,621,259 B2 * 11/2009 Mayuzumi .............. F02D 41/20 123/490
2003/0010325 A1 * 1/2003 Reischl ................... F02D 41/20 123/490
2003/0062029 A1 * 4/2003 Oyama ................... F02D 41/20 123/490
2003/0188717 A1 * 10/2003 Aubourg ............. F02D 41/3809 123/490
2008/0276907 A1 * 11/2008 Abe ........................ F02D 41/20 123/472
2009/0005955 A1 1/2009 Askew
2009/0177369 A1 * 7/2009 Miyake ................... F02D 41/20 701/105
2009/0217914 A1 * 9/2009 Casasso .................. F02D 41/20 123/490
2012/0318883 A1 * 12/2012 Kusakabe ............... F02D 41/20 239/1
2013/0139791 A1 6/2013 Kusakabe et al.
2016/0076498 A1 * 3/2016 Aono ...................... F02D 41/20 123/490
2016/0177855 A1 * 6/2016 Kusakabe ............... F02D 41/20 123/490

FOREIGN PATENT DOCUMENTS

JP 2001-221121 A 8/2001
JP 3529577 B2 5/2004
JP 2009-36196 A 2/2009
WO WO 2012/029507 A1 3/2012

* cited by examiner $$V_L = \frac{d\phi}{dt} \quad \cdots \text{ EXPRESSION (1)}$$

$$\phi = L \cdot I \quad \cdots \text{ EXPRESSION (2)}$$

$$V_L = L \cdot \frac{dI}{dt} + I \cdot \frac{dL}{dt} \quad \cdots \text{ EXPRESSION (3)}$$

$$V_{Rinj} = R_{inj} \cdot I \quad \cdots \text{ EXPRESSION (4)}$$

DRIVE DEVICE FOR FUEL INJECTION DEVICE

TECHNICAL FIELD

The present invention relates to a drive unit for a fuel injection device that is used in an internal combustion engine or the like.

BACKGROUND ART

In recent years, improvement in fuel economy (fuel consumption) has been required in relation to enhancement of exhaust gas regulation for carbon dioxide, or depletion of fossil fuels. As effective countermeasures against these concerns, great attention is paid to a downsized engine, the size of which is decreased by reducing engine displacement, and output is obtained using a supercharger. In the downsized engine, pumping loss or friction is reduced due to the reduction of the engine displacement, and thus it is possible to improve fuel economy. In contrast, it is possible to improve fuel economy by obtaining sufficient output using the supercharger, and preventing the lowering of a compression ratio associated with supercharging by virtue of intake air cooling effects associated with direct in-cylinder injection. In particular, the fuel injection device used in the downsized engine is required to be able to inject fuel over a wide range from the minimum amount of injection corresponding to the minimum output associated with small engine displacement to the maximum amount of injection corresponding to the maximum output associated with supercharging, and the expansion of a control range of the amount of injection has been required.

Typically, the amount of injection of the fuel injection device is controlled by a pulse width of an injection pulse that is output from an electronic control unit (ECU). When the injection pulse width is increased, the amount of injection is increased, and when the injection pulse width is decreased, the amount of injection is decreased. The relationship between the injection pulse width and the amount of injection is substantially linear. However, in the region with a small injection pulse width, due to a rebound phenomenon (rebound motion of the movable core) occurring when the movable core comes into contact with the fixed core and the like, the time from when the injection pulse is stopped and to when the movable core reaches a closed valve position is changed, and since the amount of injection is not linearly changed relative to the injection pulse width, the controllable minimum amount of injection of the fuel injection device is increased, which is a problem. The amounts of injection of individual fuel injection devices may not be stable due to the rebound phenomenon of the movable core, and thus the controllable minimum amount of injection has to be set based on an individual fuel injection device with the maximum amount of injection, thereby causing an increase in the controllable minimum amount of injection. When the injection pulse width is further decreased from a non-linear region in which the relationship between the injection pulse and the amount of injection is not linear, the movable core does not come into contact with the fixed core, that is, the movable core is present in a medium lift region in which the valve body is not fully lifted. In the medium lift region, even if the same injection pulse is supplied to the fuel injection device for each cylinder, the amounts of lift of the fuel injection devices are different due to the difference between the individual fuel injection devices caused by dimensional tolerances of the fuel injection devices, and thus individual-to-individual variations in the amount of injection are increased, and the driving of the fuel injection device in the medium lift region becomes a problem from the viewpoint of combustion stability.

As described above, in order to improve fuel economy, it is necessary to reduce variations in the amount of injection of the fuel injection device and to reduce the controllable minimum amount of injection, and in order to considerably reduce the minimum amount of injection, it is required to control the amount of injection in the region with a small injection pulse in which the relationship between the injection pulse width and the amount of injection is not linear, or the medium lift region in which the injection pulse is small, and the valve body does not reach a target amount of lift.

In order to reduce variations in the amount of injection and the minimum amount of injection, the drive unit for the fuel injection device for each cylinder is required to be able to detect changes (which are caused by a rebound phenomenon occurring when the movable core comes into contact with the fixed core and the like during valve opening) in the time from when the injection pulse is stopped and to when the movable core reaches a closed valve position, variations in valve operation, or variations in the amount of injection.

A fuel injection control device disclosed in PTL 1 detects a timing when the movable core comes into contact with the fixed core by detecting a timing when a second-order differential value of current switches from a negative value to a positive value based on a phenomenon in which magnetic resistance of a magnetic circuit (which is formed by the movable core and the fixed core) is reduced due to a rapid decrease in the air gap between the movable core and the fixed core, and the magnetic materials are magnetically saturated and inductance in the magnetic circuit is changed due to an increase in magnetic fluxes through the movable core and the fixed core.

According to a method disclosed in PTL 2, based on the fact that the on and off cycle of the drive current of the electromagnetic valve increases when a valve opening operation progresses, and inductance in a drive coil increases, the valve is determined to be opened when the on and off cycle is longer than a set value.

CITATION LIST

Patent Literature

[PTL 1] JP-A-2001-221121
[PTL 2] JP-A-4-287850

SUMMARY OF INVENTION

Technical Problem

In the description above, the method, in which changes in inductance caused by the operation of the electromagnetic valve are detected based on changes in current over time or changes in the on and off control cycle of the drive current, has been proposed.

However, according to the detection method disclosed in PTL 1, in the electromagnetic valve that is magnetically saturated before the air gap is reduced, or the energization current, magnetic saturation is already reached, and thus changes in inductance caused by a reduction in the air gap are small, and it is difficult to detect valve opening.

In the fuel injection device that injects fuel at a high fuel pressure, the electromagnetic valve is required to be energized with a high current for a short period of time so that the electromagnetic valve can be opened. Accordingly, the energization current of the electromagnetic valve is increased in a short period of time by applying a high voltage boosted from a battery voltage. In this use, current is rapidly changed due to a high voltage being applied, and thus changes in inductance associated with the valve opening cannot be easily identified based on changes in current.

In the device disclosed in PTL 2, the time resolution of the detection is fixed to the aforementioned set value of the on and off cycle. The set value of the on and off cycle is set to be greater than an on and off cycle of when the valve opening is not performed, and naturally, it is necessary to decrease the on and off cycle of when the valve opening is not performed such that the time resolution of the detection is improved. However, it is difficult to decrease the on and off cycle due to an increase in electromagnetic noise, and in the loss of a switching element.

An object of the present invention is to provide a drive unit for a fuel injection device that can reliably detect a valve opening timing with high accuracy, that is, an operation timing of a valve body which is required to correct variations in the amount of fuel injection caused by individual-to-individual variations between a plurality of electromagnetic valves, and characteristic changes induced by deterioration.

Solution to Problem

In order to solve the problem, according to an aspect of the invention, there is provided a drive unit for a fuel injection device which applies a first voltage between both ends of the electromagnetic valve via the turning on of a first switching element, and applies a second voltage between both ends of the electromagnetic valve via the turning on of a second switching element with the second voltage lower than the first voltage, and thus drives an electromagnetic valve such that the electromagnetic valve is opened and closed, wherein when, after the first switching element is turned on, and energization current of the electromagnetic valve increases to a first current value, the first switching element is turned off, the second switching element is turned on, the electromagnetic valve is energized with current lower than the first current value for a predetermined period, the second switching element is not turned off during the predetermined period, and the electromagnetic valve is detected to have reached a target amount of control lift based on the energization current of the electromagnetic valve.

Advantageous Effects of Invention

According to the present invention, it is possible to reliably detect the complete valve opening timing for the electromagnetic valve with high accuracy. According to the aspect of the present invention, it is possible to switch to the drive mode in which the detected information can be used for feedback control, and thus it is possible to provide the fuel injection device capable of injecting fuel with high accuracy, and an internal combustion engine.

BRIEF DESCRIPTION OF DRAWINGS

FIG. 10 illustrates operation waveforms (normal drive mode) for the electromagnetic valve in a seventh embodiment.

DESCRIPTION OF EMBODIMENTS

Hereinafter, in a first embodiment of the present invention, the configuration of a fuel injection device and a drive unit therefor will be described in detail with reference to FIGS. 1, 2, 3, and 5, and an operation will be described in detail with reference to FIG. 4.

First Embodiment

Figure 1:
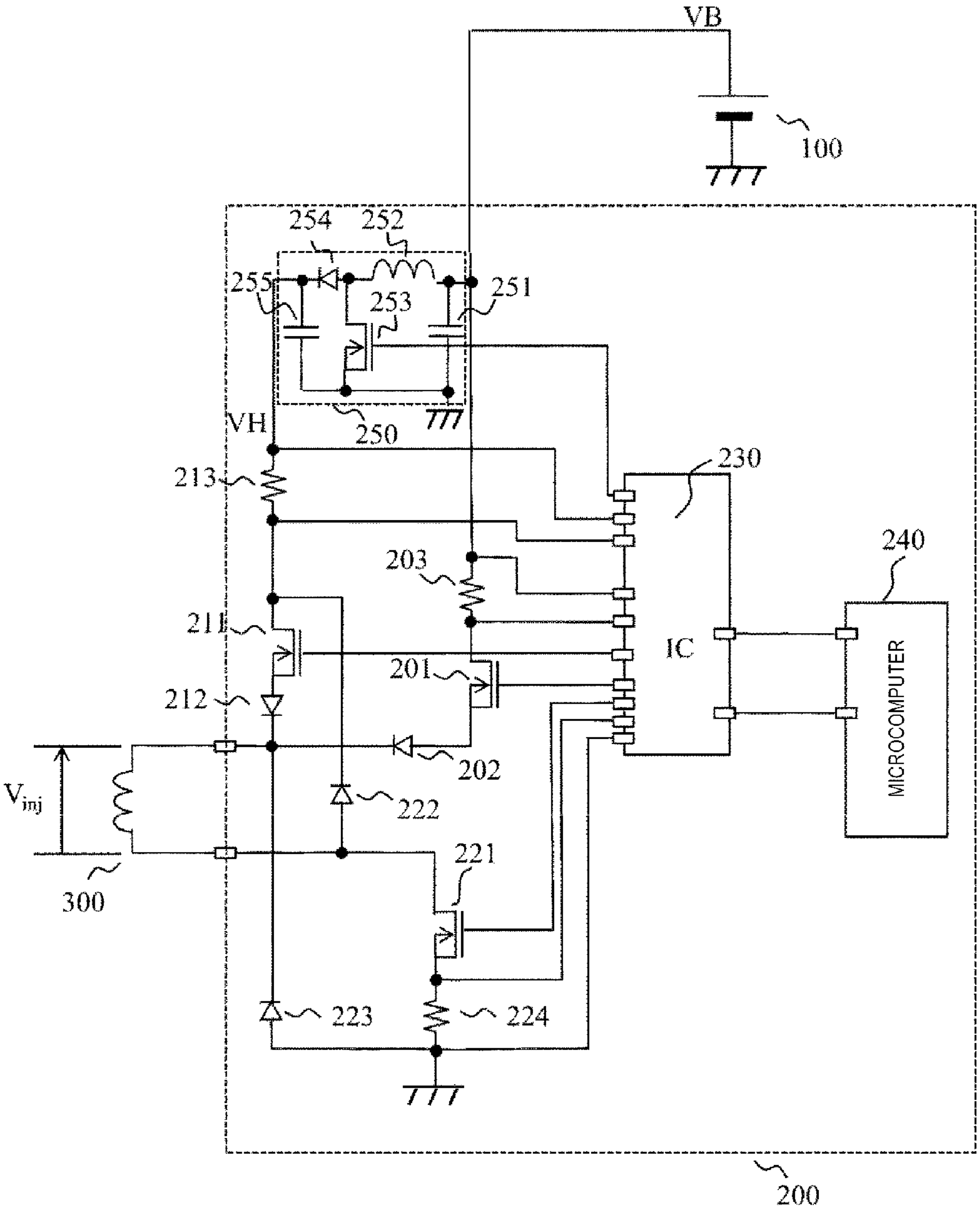
FIG. 1 is a block diagram illustrating the configuration of an electromagnetic valve drive circuit of a fuel injection device in a first embodiment.

FIG. 1 is a diagram illustrating the configuration of an electromagnetic valve drive circuit of a fuel injector drive unit in a first embodiment, and illustrates a drive circuit for a single electromagnetic valve 300. A fuel injection device is connected to a battery 100 that is an in-vehicle battery, and an electromagnetic valve drive circuit 200, and includes the electromagnetic valve 300. The electromagnetic valve 300 is, for example, configured to include a solenoid coil and the like. The electromagnetic valve drive circuit includes a boost circuit 250; an FET (Hi) 211; a reverse flow protection diode (Hi) 212; and a shunt resistor (Hi) 213 for current measurement, and applies a voltage of VH output from the boost circuit 250 to the electromagnetic valve 300 by controlling the FET (Hi) 211. The electromagnetic valve drive circuit includes an FET (Mid) 201; a reverse flow protection diode (Mid) 202; and a shunt resistor (Mid) 203 for current measurement, and applies a battery voltage VB to the electromagnetic valve 300 by controlling the FET (Mid) 201.

An FET (Lo) 221 and a shunt resistor (Lo) 224 for current measurement which is used to energize the electromagnetic valve 300 are provided on a downstream side of the electromagnetic valve 300, and the FET (Lo) 221 and the electromagnetic valve 300 serve as a relay for energizing the electromagnetic valve 300. The electromagnetic valve drive circuit includes a freewheel diode 223, and when the FET (Lo) 221 is turned on, and the FET (Hi) 211 and the FET (Mid) 201 are turned off, current flowing through the electromagnetic valve 300 freewheels in a closed circuit that contains the freewheel diode 223, the electromagnetic valve 300, and the FET (Lo) 221. The electromagnetic valve drive circuit includes a current-regenerative diode 222, and when the FET (Lo) 221, the FET (Hi) 211, and the FET (Mid) 201 are turned off, current flowing through the electromagnetic valve 300 is regenerated in an output capacitor 255 of the boost circuit 250. The boost circuit 250 is configured to include an input capacitor 251; a boost coil 252; a boost FET 253; a boost chopper 254; and the output capacitor 255, and boosts the battery voltage VB to a boosted voltage of VH by controlling the boost FET 253.

An IC 230 monitors current flowing through the shunt resistors 203, 213, and 224, and drives the FETs 201, 211, 221, and 253 by applying gate signals thereto. There is no problem building the FETs 201, 211, and 221 into the IC. A micro-computer 240 acquires information regarding current and voltage monitored by the IC 230, information from various sensors (not illustrated), and the like, and applies information regarding an injection pulse or an injection mode to the IC 230, on which an injection time of the electromagnetic valve is determined to obtain an appropriate amount of injection. The IC 230 receives the information regarding an injection pulse or an injection mode, and then generates gate signals. The micro-computer 240 and the drive circuit including the IC 230 and the like may be made as a single electronic control unit, or may be made as separate electronic control units.

Figure 2:
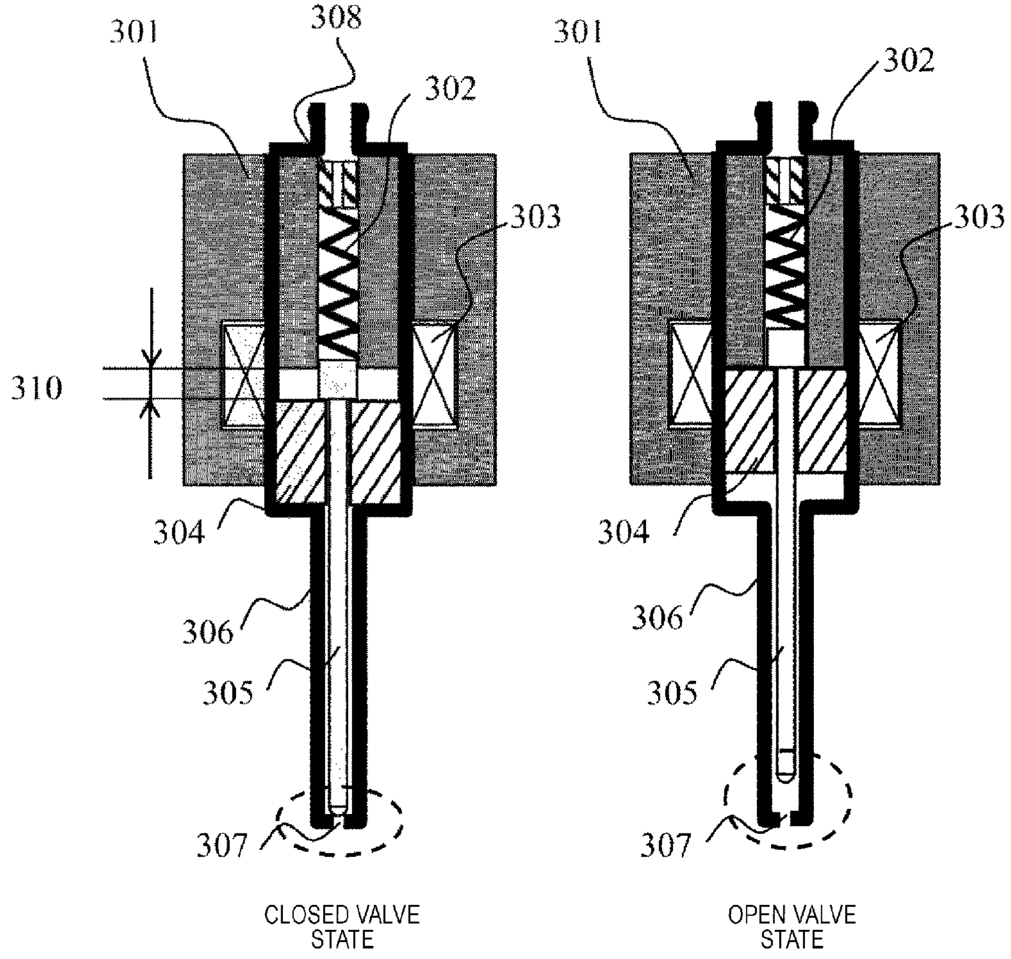
FIG. 2 is a schematic sectional view of an electromagnetic valve in the first embodiment.

FIG. 2 illustrates schematic sectional views of the electromagnetic valve 300. For the purpose of comparison, one illustrates a closed valve state, and the other illustrates an open valve state. The electromagnetic valve 300 is configured to include a fixed core 301; a spring 302; a coil 303; a movable core 304; a valve body 305; and a nozzle holder 306. The spring 302 is pressed in a compression direction by a spring presser 308 fixed to the fixed core 301. The spring 302 biases the valve body 305 and the movable core 304 in a downward direction in FIG. 2. For this reason, when the coil 303 is not energized, a tip end of the valve body 305 is pressed against the nozzle holder 306 such that the valve is closed. At this time, an air gap 310 is present between the fixed core 301 and the movable core 304. In FIG. 2, the valve body 305 and the movable core 304 are configured in such a way as to be able to be displaced relative to each other; however, the valve body 305 and the movable core 304 may be integrally formed.

When the coil 303 is energized, and a magnetic attraction force is applied to the fixed core 301 and the movable core 304, and exceeds the sum of a spring force (force in a valve closing direction) and a fuel pressure applied to the valve body, the movable core 304 is biased in an upward direction in FIG. 2, and the valve body 305 is pressed upwards, and thus the valve body 305 moves away from the nozzle holder 306, and the valve is opened. As a result, fuel is injected via a fuel injection hole 307. In the open valve state, the air gap 310 is much smaller than that in the closed valve state. When the air gap between the fixed core 301 and the movable core 304 is decreased during transition from the closed valve state to the open valve state, magnetic fluxes passing through both the fixed core 301 and the movable core 304 increase, thereby causing inductance to increase. The electromagnetic valve 300 may be configured such that the movable core preliminarily moves in a valve opening direction due to a magnetic attraction force before the valve body moves away from the nozzle holder, the movable core comes into contact with the valve body, and the valve body moves away from the nozzle holder.

Figure 3:
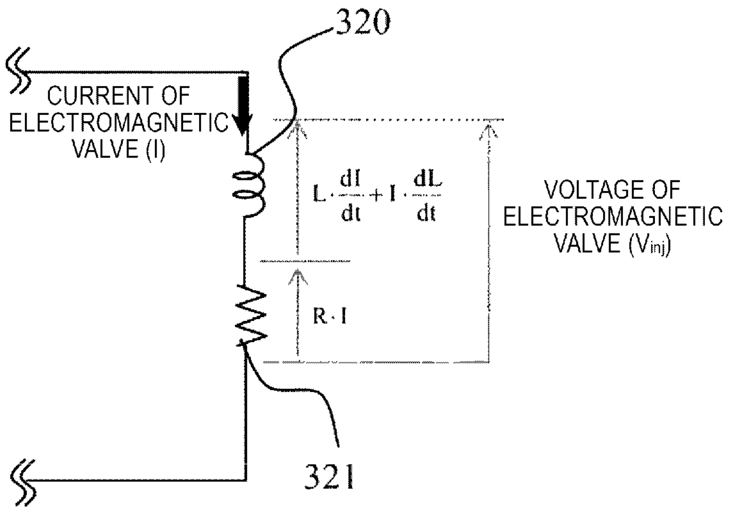
FIG. 3 is an equivalent circuit for the electromagnetic valve in the first embodiment.

FIG. 3 illustrates a simplified equivalent circuit for the electromagnetic valve 300. The coil of the electromagnetic valve can be simply represented by an inductance component 320 and a winding wire resistance component 321 which are connected in series to each other. A voltage $V_L$ applied to the inductance component of the coil can be represented by expression (1), and can be represented by expression (3) using expression (2). From a second term on the right side of expression (3), it can be understood that an induced electromotive force is generated to disturb the flow of current through the electromagnetic valve 300 when inductance increases with a decrease in the air gap as described above. This is a cause of changes in current during a valve opening operation of the movable core 304. Since a positional relationship between the fixed core 301 and the movable core 304 is fixed after the valve opening operation is completed, inductance in the second term of expression (3) decreases. Therefore, the difference in induced electromotive force between when the valve opening operation is performed and after the completion of the valve opening operation occurs, and the slope of current changes. A voltage drop $V_{Rinj}$ occurring in a winding wire resistance $R_{inj}$ of the electromagnetic valve is represented by expression (4), and a voltage between both ends of the electromagnetic valve is represented by $V_{inj}=V_L+V_{Rinj}$. Typically, an induced electromotive force is represented by a negative sign, and is represented by expression (3) when the direction of flow of a voltage and current is defined as illustrated in FIG. 3. Typically, the right sides of expressions (1), (2), and (3) are multiplied by the number N of turns of the coil so as to represent the induced electromotive force of the coil; however, herein, the number N of turns of the coil is omitted for the purpose of simplicity.

The description herein is given without consideration of magnetic saturation in the magnetic cores. In a case where magnetic saturation is taken into consideration, a decrease in inductance caused by magnetic saturation overlaps an increase in inductance caused by a valve operation; however, changes in induced electromotive force caused by the valve operation similarly occur. When a decrease in inductance caused by magnetic saturation of the magnetic material which occurs with an increase in current, and an increase in inductance caused by a valve operation occur at the same time, the changes in inductance are cancelled out, which is not desirable. A method of preventing the occurrence of such a case will be discussed in the description of an operation (to be described later) (when, immediately after the valve opening operation, magnetic saturation occurs with an increase in inductance caused by the valve opening operation, current before and after the valve opening operation is completed changes considerably, which is desirable).

$$V_L = \frac{d\phi}{dt} \qquad \text{EXPRESSION (1)}$$

$$\phi = L \cdot I \qquad \text{EXPRESSION (2)}$$

$$V_L = L \cdot \frac{dI}{dt} + I \cdot \frac{dL}{dt} \qquad \text{EXPRESSION (3)}$$

$$V_{Rinj} = R_{inj} \cdot I \qquad \text{EXPRESSION (4)}$$

Figure 4:
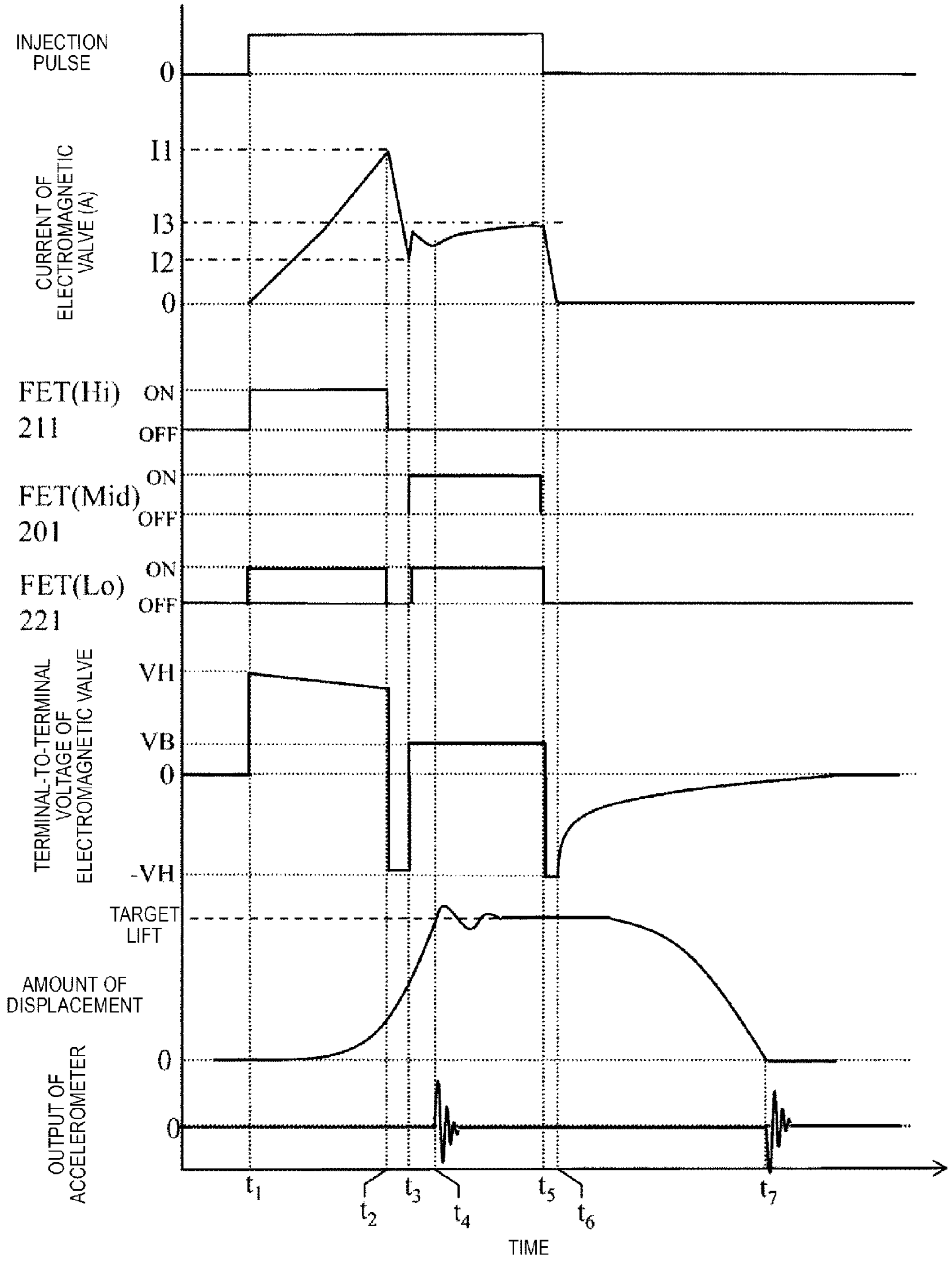
FIG. 4 illustrates operation waveforms for the electromagnetic valve in the first embodiment.

Hereinafter, in an operation of the first embodiment, FIG. 4 illustrates an injection pulse that is applied to the IC 230 from the micro-computer 240; gate signals for the FET (Mid) 201, the FET (Hi) 211, and the FET (Lo) 221; a terminal-to-terminal voltage and the drive current of the electromagnetic valve; the amount of displacement of the valve body 305; and an output of an accelerometer (not illustrated) attached to the electromagnetic valve 300.

When an injection pulse is applied at time t1, first, the FET (Hi) 211 and the FET (Lo) 221 are turned on, a voltage of VH is applied to the electromagnetic valve, and the electromagnetic valve is energized with current.

When the current of the electromagnetic valve reaches a current of I1 at time t2, the FET (Hi) 211 and the FET (Lo) 221 are turned off, and current is regenerated via the current-regenerative diode 222. Therefore, a voltage of −VH is applied to the electromagnetic valve, and the current of the electromagnetic valve decreases. The FET (Hi) 211 and the FET (Lo) 221 may be turned off using time control that determines whether an application time reaches a predetermined time instead of using comparison between the current of the electromagnetic valve and a current of I1.

When the current of the electromagnetic valve reaches a current of I2 at time t3, the FET (Mid) 201 and the FET (Lo) 221 are turned on, and the battery voltage VB is applied to the electromagnetic valve until time t5 is reached. Similarly, the FET (Mid) 201 and the FET (Lo) 221 may also be turned on by using the time control.

The amount of displacement of the valve body reaches a target amount of lift at time t4 between time t3 and time t5, that is, the movable core 304 comes into contact with the fixed core 301. At this time, an induced electromotive force is generated to disturb a flow of current as described above, and thus the current of the electromagnetic valve decreases. Since changes in inductance decrease after the valve opening is completed at time t4, the current of the electromagnetic valve gradually approaches a current value of I3 that is represented by $VB/R_{inj}$. The term ($\therefore I3=VB/R_{inj}$) represents that the slope of the current of the electromagnetic valve is changed when the valve opening is completed, and can be determined by the recognition of the pattern of a current waveform, first-order differentiation, or second-order differentiation. That is, it is possible to determine the complete valve opening by monitoring a current waveform between time t3 and time t5. The following components may be built into the IC 230: a filter that eliminates noise from current information; a differentiation circuit that extracts the characteristics of a waveform; or an A/D converter. There is no problem using a digital circuit as the filter or the differentiation circuit. When the IC 230 receives information regarding a plurality of the electromagnetic valves which have different valve opening timings, the IC 230 may receive waveform information for each of the electromagnetic valves which is divided by time using a multiplexer or the like. When a current of I2 is set to a current close to I3, $R_{inj}\times I=VB=V_{inj}$ is established, and thus a voltage applied to the inductance component decreases. Naturally, dI/dt is reduced, and the electromagnetic valve can be stably energized with current. When current is stable, magnetic saturation of the magnetic material can be prevented from causing changes in inductance. That is, it is possible to clearly identify changes in inductance caused by the valve opening operation, and changes in inductance caused by magnetic saturation of the magnetic material which occurs with an increase in current.

During the period from time t3 to time t5, the FET (Mid) 201 is not ON/OFF controlled, and is PWM controlled at 100% duty cycle. The reason for this is that switching noise occurs due to the FET (Mid) 201 being ON/OFF controlled such that the complete valve opening timing for the electromagnetic valve 300 is prevented from being correctly determined. In this configuration, the period for which the FET (Mid) 201 is not ON/OFF controlled even after the FET (Hi) 211 is turned off is provided to detect valve opening, and the current of the electromagnetic valve is monitored during this period, and thus it is possible to determine the complete valve opening only when the FET (Mid) 201 is not switched on and off. As a result, it is possible to eliminate the effects of switching noise, and to determine the complete valve opening timing. During the period from time t3 to time t5, the FET (Mid) 201 is not necessarily controlled to be on at 100% duty cycle, and may be ON/OFF controlled at a duty ratio required to control the energization of the electromagnetic valve with the current required for the operation of the electromagnetic valve. Since the micro-computer 240 or the IC 230 can recognize the timings when the FET (Mid) 201 is switched on and off, the complete valve opening may not be determined by masking the readings of the current of the electromagnetic valve when the FET (Mid) 201 is switched on and off. Accordingly, even if the FET (Mid) 201 is not controlled at 100% duty cycle during the period from time t3 to time t5, since it is possible to determine the complete valve opening only when the FET (Mid) 201 is not turned off, it is possible to prevent an erroneous determination caused by switching noise.

When the application of the injection pulse ends at time t5, and the FET (Hi) 211, the FET (Mid) 201, and the FET (Lo) 221 are turned off, the current of the electromagnetic valve is regenerated via the regenerative diode, and thus the voltage of the electromagnetic valve is clamped at a voltage of −VH. When the current of the electromagnetic valve decreases to 0 [A] at time t6, a regenerative current also becomes 0 [A], and thus clamping at a voltage of −VH ends, and both ends of the electromagnetic valve are set to an open state. An induced electromotive force is generated at both ends of the electromagnetic valve due to an eddy current flowing through the fixed core of the electromagnetic valve after time t6, and gradually decreases to 0 [V]. Since the current of the electromagnetic valve is cut off, the magnetic attraction force decreases, and the electromagnetic valve is biased by the spring, and is closed at time t7.

The accelerometer can detect the complete valve opening timing and the complete valve closing timing, and these timings can be identified from a waveform which is output from the accelerometer illustrated in FIG. 4. The accelerometer detects vibration induced by collision between the fixed core 301 and the movable core 304 at the complete valve opening timing, and detects vibration induced by collision between the valve body 305 and the nozzle holder 306 at the complete valve closing timing.

In the embodiment, the simplified electromagnetic valve illustrated in FIG. 2 has been described as an example; however, since, in theory, the same phenomenon occurs in the electromagnetic valve made up of the coil and the magnetic material, as described above, the electromagnetic valve, which has a more complicated configuration in which the movable core preliminarily moves in the valve opening direction due to a magnetic attraction force before the valve body moves away from the nozzle holder, may be used.

Since current is increased by the application of a voltage of VH boosted by the boost circuit, it is possible to perform detection corresponding to high speed valve opening in an internal combustion engine running at a high fuel pressure.

Current is decreased by the application of a voltage of −VH during the period from time t2 to time t3; however, a method of decreasing current is not limited to this method. For example, even if current decreases in a freewheeling state via the freewheel diode 223, it is possible to detect the complete valve opening timing.

The current of the electromagnetic valve rapidly increases toward a current of I3 immediately after the FET (Mid) 201 is turned on at time t3, and the electromagnetic valve is considered to be affected by an eddy current generated in the fixed core 301 such that changes in magnetic fluxes caused by changes in the coil current of the electromagnetic valve are cancelled out. Since the increase in the current of the electromagnetic valve is not caused by the valve opening operation, and becomes a cause of erroneous detection, preferably, the detection of the complete valve opening timing starts slightly later than time t3.

In the embodiment, the operation of a single electromagnetic valve has been described; however, it is possible to obtain the same effects with a plurality of the electromagnetic valves.

Since changes in the battery voltage VB during the period from time t3 to time t5 cause changes in the current of the electromagnetic valve, the battery voltage VB is required to be stable during the detection of valve opening. For this reason, a method, in which determination is effectively made by monitoring the battery voltage VB using the microcomputer and selecting detection data when the battery voltage VB is stable, may be adopted.

The fuel injection device of the embodiment is not limited to a fuel injection device that is independently used, and may be mounted on an engine controller unit (ECU) or an internal combustion engine such as a direct in-cylinder injection gasoline engine.

As described above, according to the fuel injection device of the embodiment, it is possible to obtain the following effects. Since a detection period is provided within the period from time t3 (or a time later than time t3) to time t5, it is possible to clearly identify changes in inductance caused by the valve opening operation, and to detect the timing for valve opening caused by current. Since current is increased by the application of a voltage of VH boosted by the boost circuit, it is possible to perform detection corresponding to high speed valve opening in an internal combustion engine running at a high fuel pressure.

Second Embodiment

Figure 5:
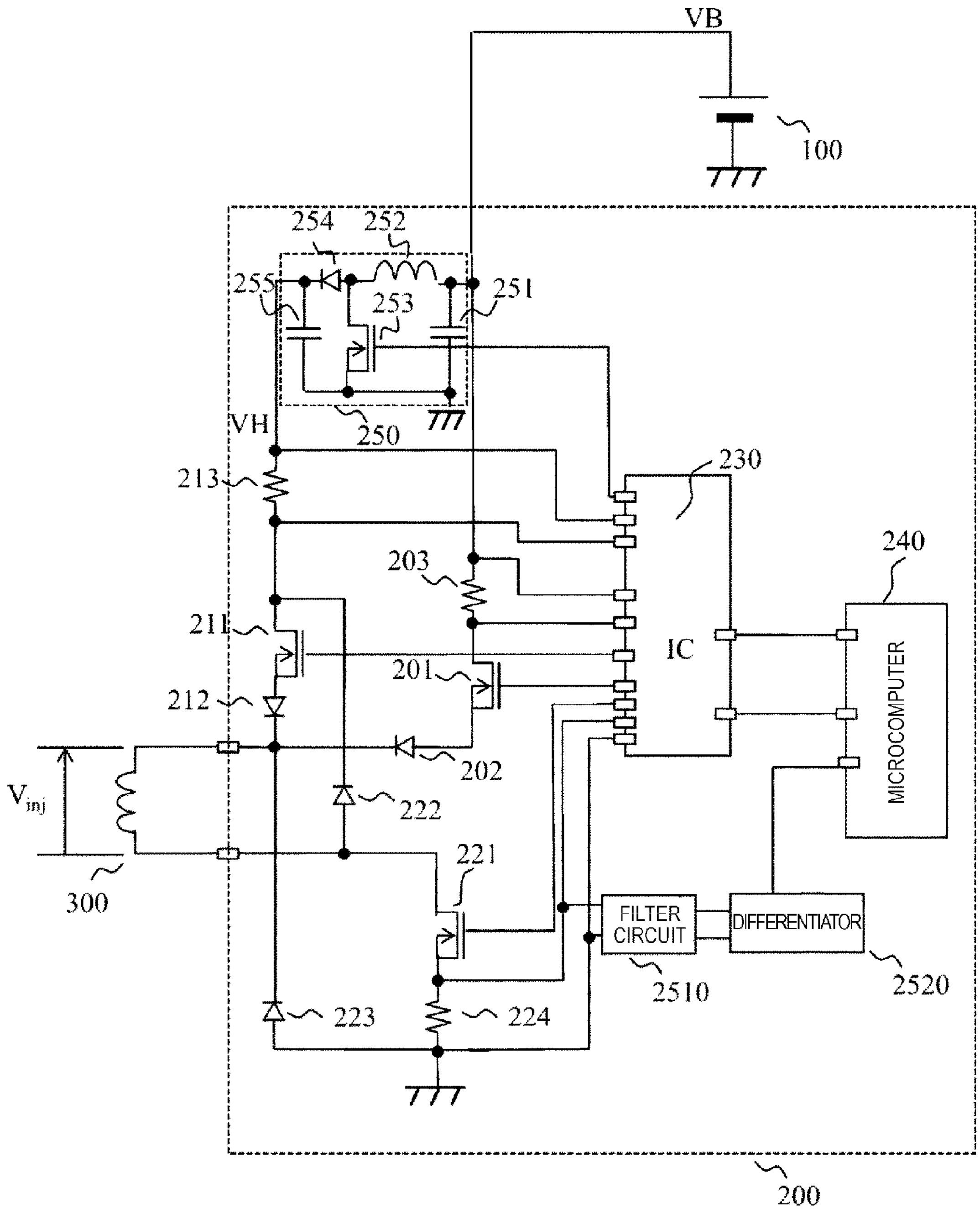
FIG. 5 is a block diagram illustrating the configuration of the electromagnetic valve drive circuit of the fuel injection device in a second embodiment.
Figure 6:
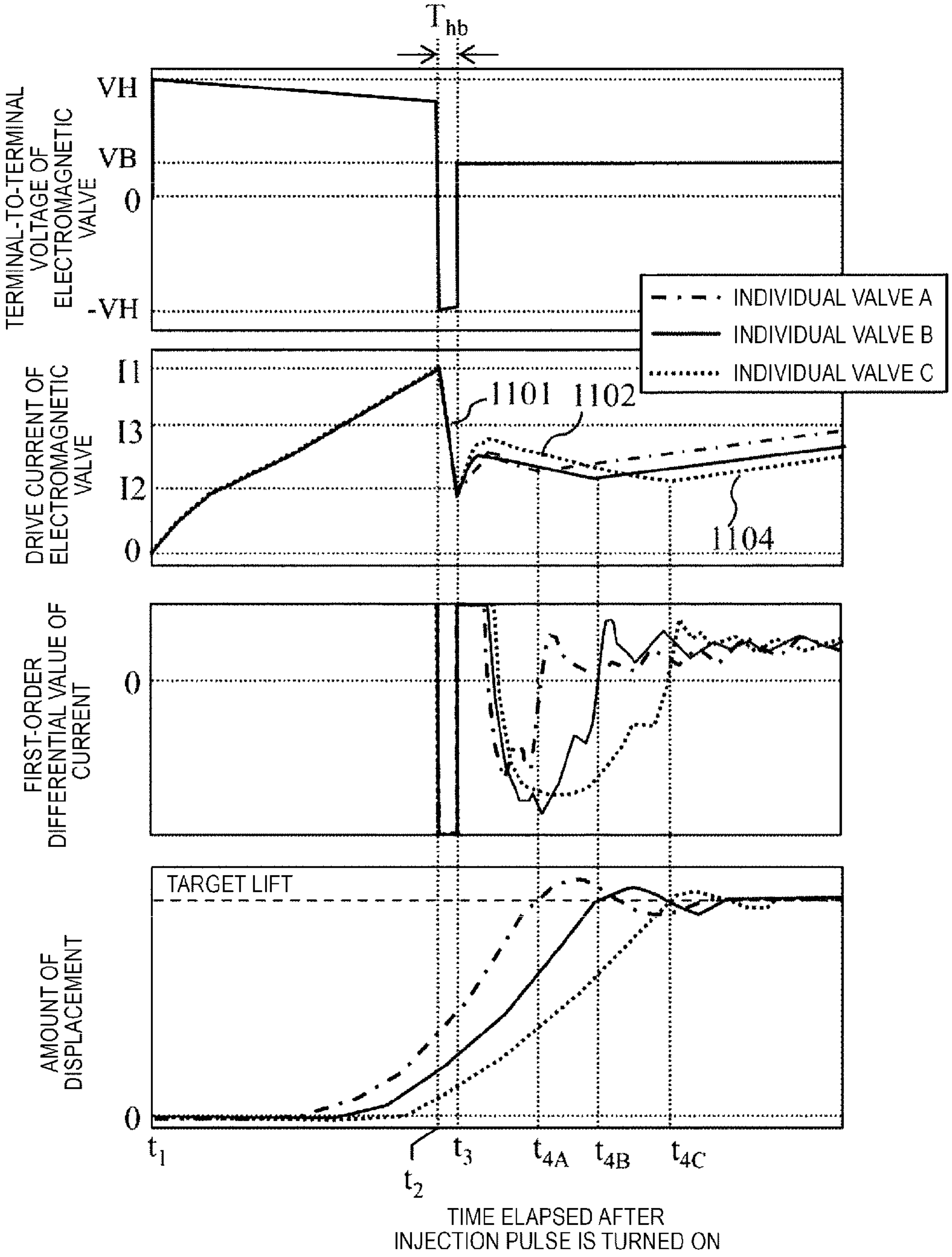
FIG. 6 illustrates operation waveforms for the electromagnetic valve in the second embodiment.

Hereinafter, a second embodiment of the present invention will be described in detail with reference to FIGS. 5 and 6. FIG. 5 is equivalent to FIG. 1 in the first embodiment, and FIG. 6 is equivalent to FIG. 3 in the first embodiment. The same reference signs are assigned to the same portions as those in the first embodiment, descriptions thereof are omitted, and hereinafter, only different portions will be described.

The electromagnetic valve drive circuit 200 illustrated in FIG. 5 is different from that in the first embodiment in that a filter circuit 2510 and a differentiator 2520 are added thereto. In the first embodiment, the IC 230 determines valve opening by processing the current of the electromagnetic valve detected by the shunt resistor (L0) 224; however, in this embodiment, the filter circuit 2510 and the differentiator 2520 are provided independently from the IC 230, and thus the IC 230 is not required to have special functions. As a result, it is possible to reduce the development time and the development cost of the IC.

FIG. 6 illustrates enlarged waveforms for the terminal-to-terminal voltage of the electromagnetic valve, the drive current of the electromagnetic valve, the first-order differential value of current, and the amount of displacement at the complete valve opening timing, and FIG. 6 is different in that waveforms of individual electromagnetic valves A, B, and C with individual-to-individual variations in spring strength and dimensions are illustrated. The first-order differential value of current is an output of the differentiator 2520, and times t4A, t4B, and t4C for the complete valve opening coincide with zero cross times when a curve of the current of the electromagnetic valve is concave downwards, and the first-order differential value of current changes from a negative value to a positive value. That is, it is possible to determine the complete valve opening using the first-order differential value of current.

An additional differentiator may be provided, and thus second-order differentiation may be performed. In this case, the current of the electronic valve is peaked at t4A, t4B, and t4C, and similarly, it is possible to determine the complete valve opening timing.

Third Embodiment

Figure 7:
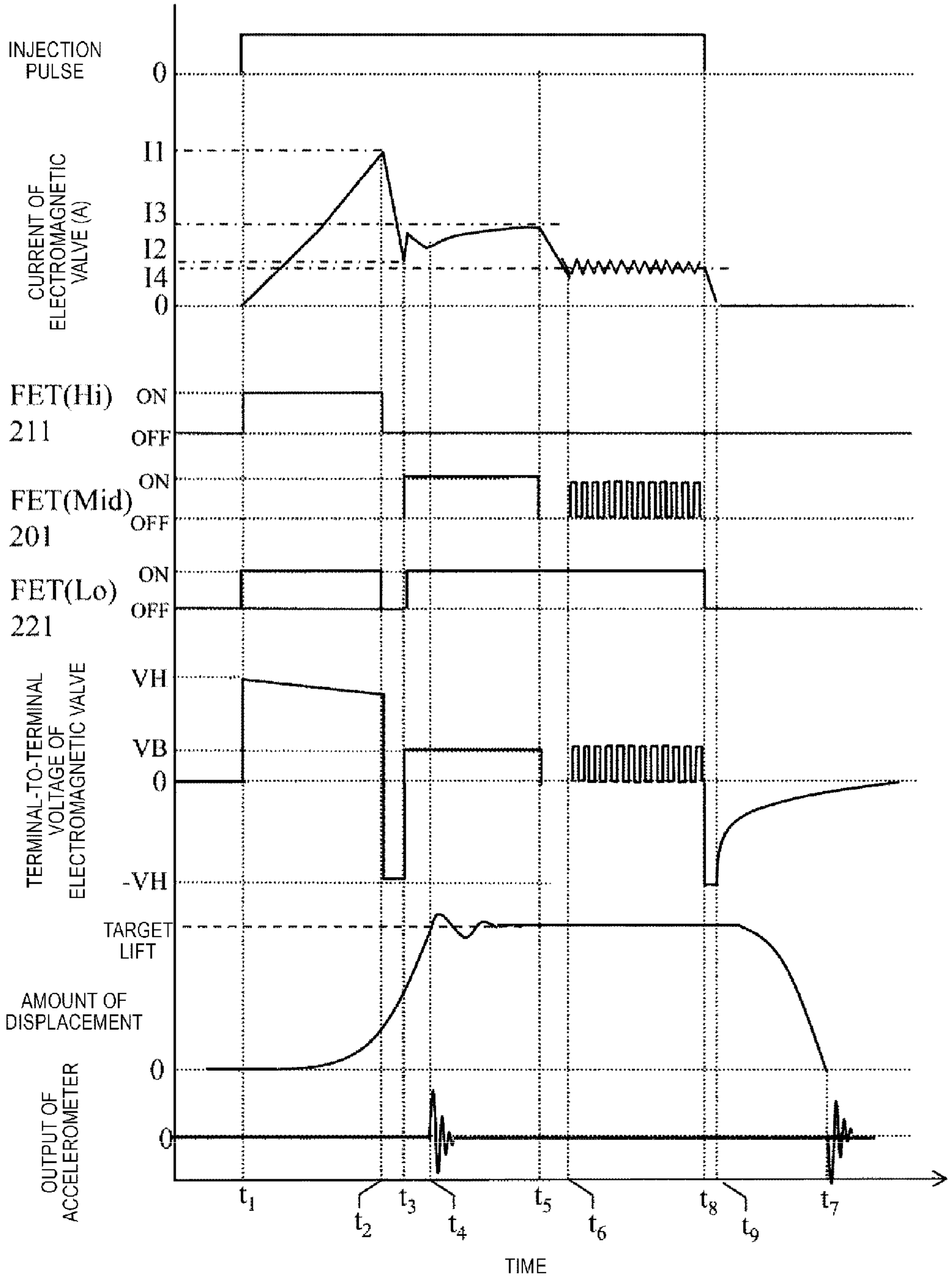
FIG. 7 illustrates operation waveforms for the electromagnetic valve in a third embodiment.

Hereinafter, a third embodiment of the present invention will be described in detail with reference to FIGS. 1 and 7. FIG. 1 has been described in the first embodiment, and FIG. 7 is equivalent to FIG. 4 in the first embodiment. The same reference signs are assigned to the same portions as those in the first embodiment, descriptions thereof are omitted, and hereinafter, only different portions will be described.

In operation waveforms illustrated in FIG. 7, the control of the FETs 201, 211, and 221 after time t5 is different from that in the first embodiment. This embodiment is different in that a current of I4 lower than I3 is maintained by turning on and off the FET (Mid) 201 from time t6, and applying pulse-shaped voltages to the electromagnetic valve multiple times. For example, a current of I4 is set to the minimum value required to maintain the valve opening of the electromagnetic valve 300. Since the electromagnetic valve is energized with a current of I4 that is lower than I3, it is possible to maintain the valve opening of the electromagnetic valve 300 during the period corresponding to an injection pulse while better preventing the electromagnetic valve from generating heat compared to when the electromagnetic valve is continuously energized with a current of I3, and it is possible to control a fuel injection time (the amount of injection). Since the electromagnetic valve is energized with a current of I4 that is lower than I3, after the injection pulse ends at time t8, it is possible to more quickly shut off the current, and to reduce the amount of eddy current flowing through the fixed core after the current is shut off. Therefore, it is possible to close the valve at a higher speed, and to improve accuracy in controlling the amount of injection. In contrast, unlike the period from time t5 to time t8, during the period from time t3 to time t5, the FET (Mid) 201 is not turned on and off (or the number of times of ON and OFF transitions is small), and thus it is possible to reduce switching noise during the period for which the detection of valve opening is performed.

In the third embodiment, during the period from time t5 to time t6, the FET (Lo) 221 is turned on, the FET (Mid) 201 is turned off, and the freewheel diode 223 is energized with freewheel current such that the current is decreased. In contrast, the FET (Lo) 221 may be turned off, the FET (Mid) 201 may be turned off, a voltage of −VH may be applied to the electromagnetic valve via the energization of the current-regenerative diode 222 such that the current is decreased.

Fourth Embodiment

Figure 8:
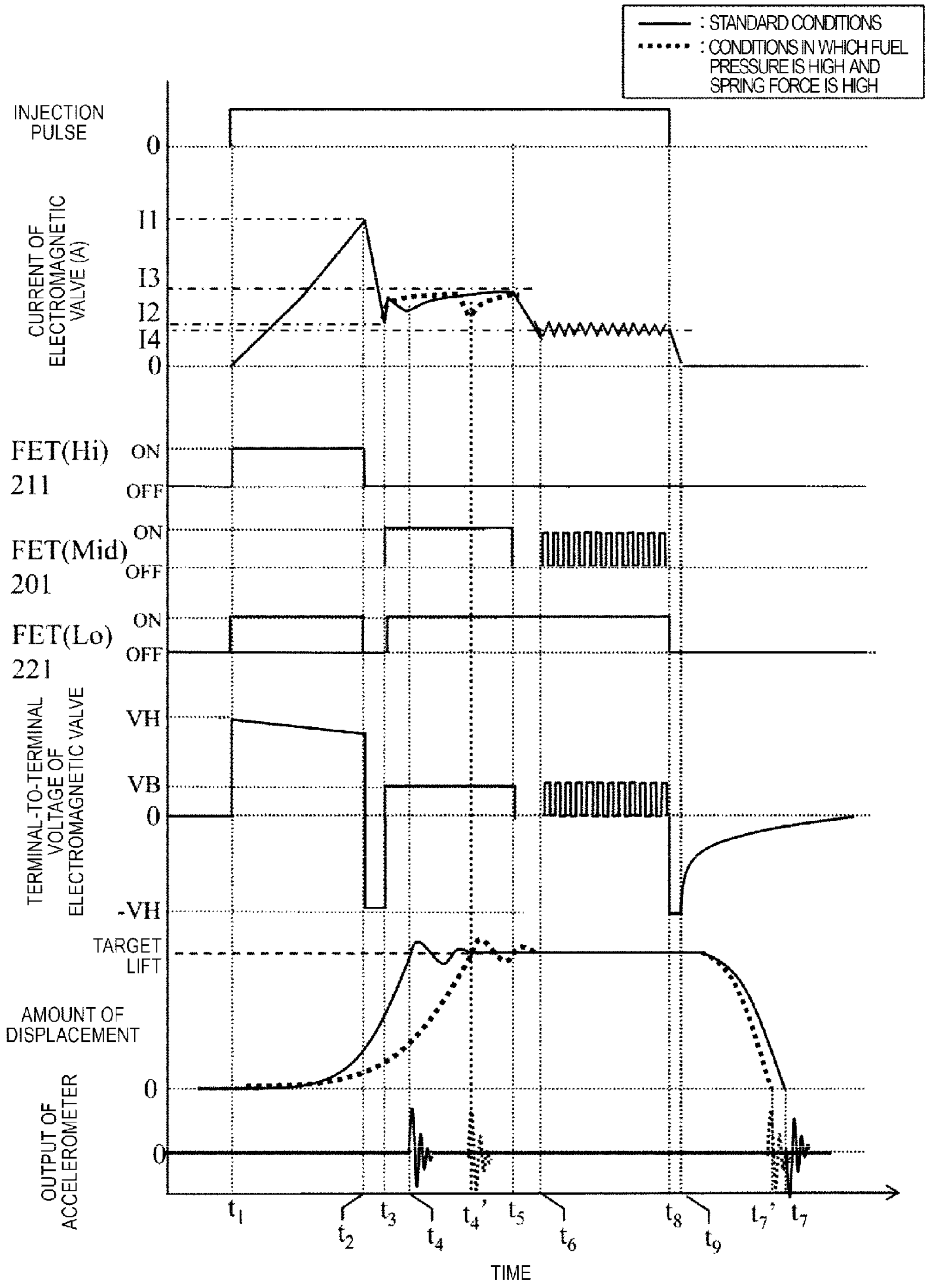
FIG. 8 illustrates operation waveforms for the electromagnetic valve in a fourth embodiment.

Hereinafter, a fourth embodiment of the present invention will be described in detail with reference to FIG. 8. FIG. 8 is equivalent to FIG. 7 in the third embodiment. The same reference signs are assigned to the same portions as those in the fourth embodiment, descriptions thereof are omitted, and hereinafter, only different portions will be described.

Operation waveforms in FIG. 8 are different in that the operation waveforms include waveforms for the amount of lift and current, and outputs of the accelerometer at the highest fuel pressure required to be dealt with and a high spring force. Typically, the complete valve opening timing is delayed to the extent that a fuel pressure is increased, and a spring force is increased. For this reason, when a fuel pressure is high and a spring force is high, the valve opening is completed at time t4' that is later than time t4. Since time t4' is present in the period from time t3 to time t5, a curve of the current of the electromagnetic valve is concave downwards at time t4', and thus it is possible to detect the valve opening.

In the embodiment, while a delay in valve opening caused by deterioration in the characteristics of the electromagnetic valve is taken into consideration, time t5 is set in such a way that the valve opening detection period from t3 in which the battery voltage VB is applied in a direct current mode (switching noise is reduced) to t5 contains the complete valve opening timing t4' which is most delayed at a high fuel pressure and a high spring force in a range of fuel pressure required to be dealt with and in a range of variations in spring force. Accordingly, it is possible to avoid the non-detection of the complete valve opening, and to more reliably detect the complete valve opening under the conditions in which the valve opening is delayed.

Since force is applied in the valve closing direction at a high fuel pressure and a high spring force, valve closing timing time t7' is earlier than time t7.

Fifth Embodiment

Figure 9:
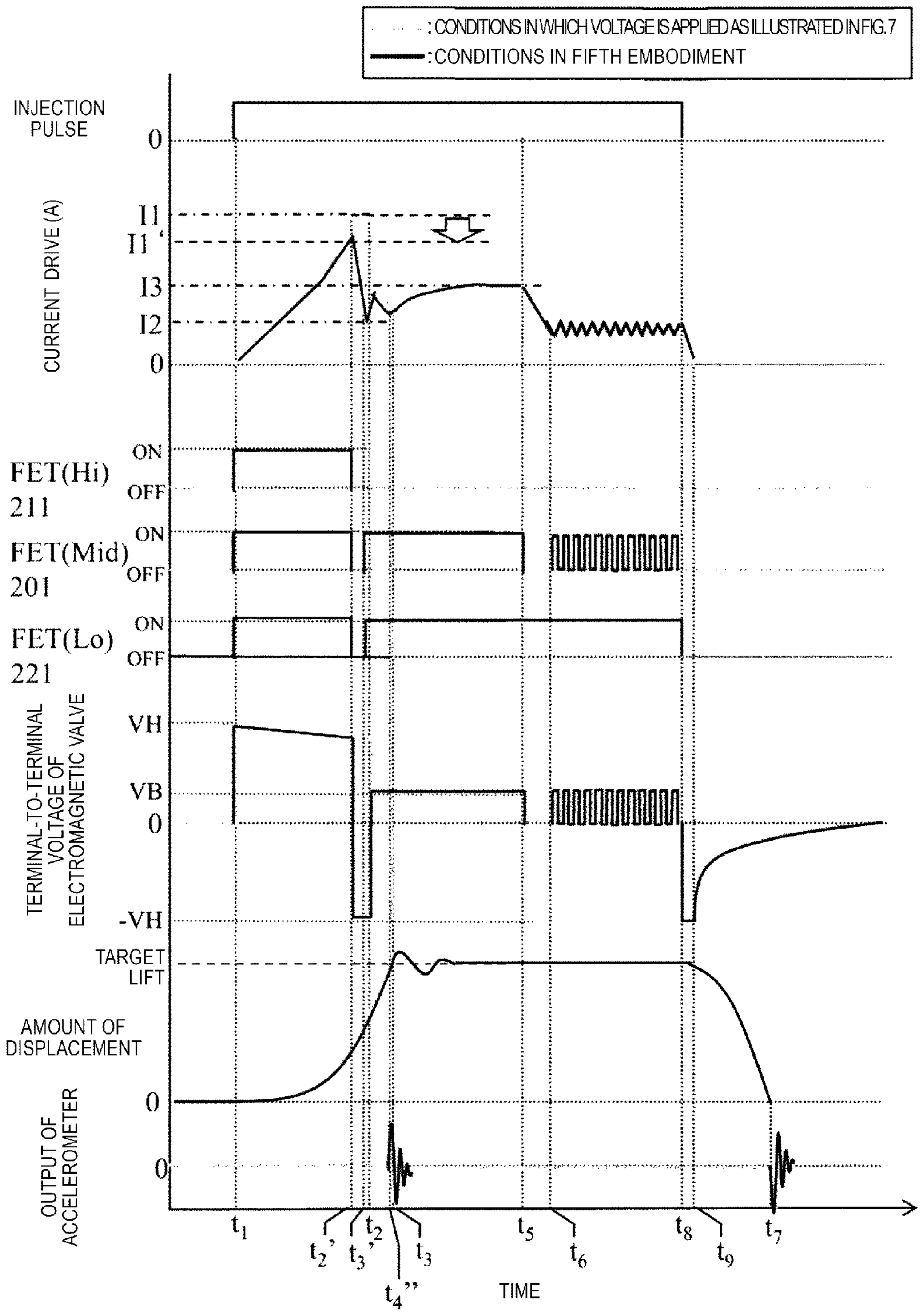
FIG. 9 illustrates operation waveforms for the electromagnetic valve in a fifth embodiment.

Hereinafter, a fifth embodiment of the present invention will be described in detail with reference to FIG. 9. FIG. 9 is equivalent to FIG. 7 in the third embodiment. The same reference signs are assigned to the same portions as those in the third embodiment, descriptions thereof are omitted, and hereinafter, only different portions will be described.

A description to be given in the fifth embodiment relates to an operation in which the complete valve opening timing is not detected in the period from t3 to t5 because the characteristics of the electromagnetic valve change due to deterioration or the like.

The fifth embodiment is different in that the complete valve opening timing in FIG. 9 is time t4", and is earlier than time t3. The gray solid line illustrates the current of the electromagnetic valve when the FETs 211, 201, and 221 are driven under the conditions in which the same voltage in FIG. 7 is applied. Since the complete valve opening timing t4" is earlier than time t3 in the conditions in which the voltage in FIG. 7 is applied, it is not possible to detect the valve opening in the period from t3 to t5 for which switching noise is reduced. Before t3 when energization current is increased or decreased due to a boost voltage being applied, changes in current are large, and thus it is difficult to identify changes in current caused by an induced electromotive force, and to detect the complete valve opening.

In this case, as in the fifth embodiment, the peak current I1 of the electromagnetic valve is reduced to I1', and thus time t2 to reach I2 is pulled ahead to t2'. Accordingly, time t3 when the battery voltage VB is applied can be pulled ahead to time t3' that is earlier than time t4". By virtue of this operation, even if the complete valve opening timing is pulled ahead due to deterioration in the characteristics of the electromagnetic valve or the like, it is possible to reliably detect the complete valve opening.

In order to reduce I1 to I1', a current set value may be changed from I1 to I1', or a pulse application time for the FET (Hi) 211 may be reduced (control may be performed using a current value or time). According to the control methods in the fourth and fifth embodiments, the electromagnetic valve can be controlled such that the valve opening is completed in the valve opening detection period from t3 to t5, and thus, even if the complete valve opening timing may be changed due to changes in the operational status of an engine, the deterioration of an engine over time, or the like, it is possible to reliably detect the complete valve opening timing.

Sixth Embodiment

Figure 10:
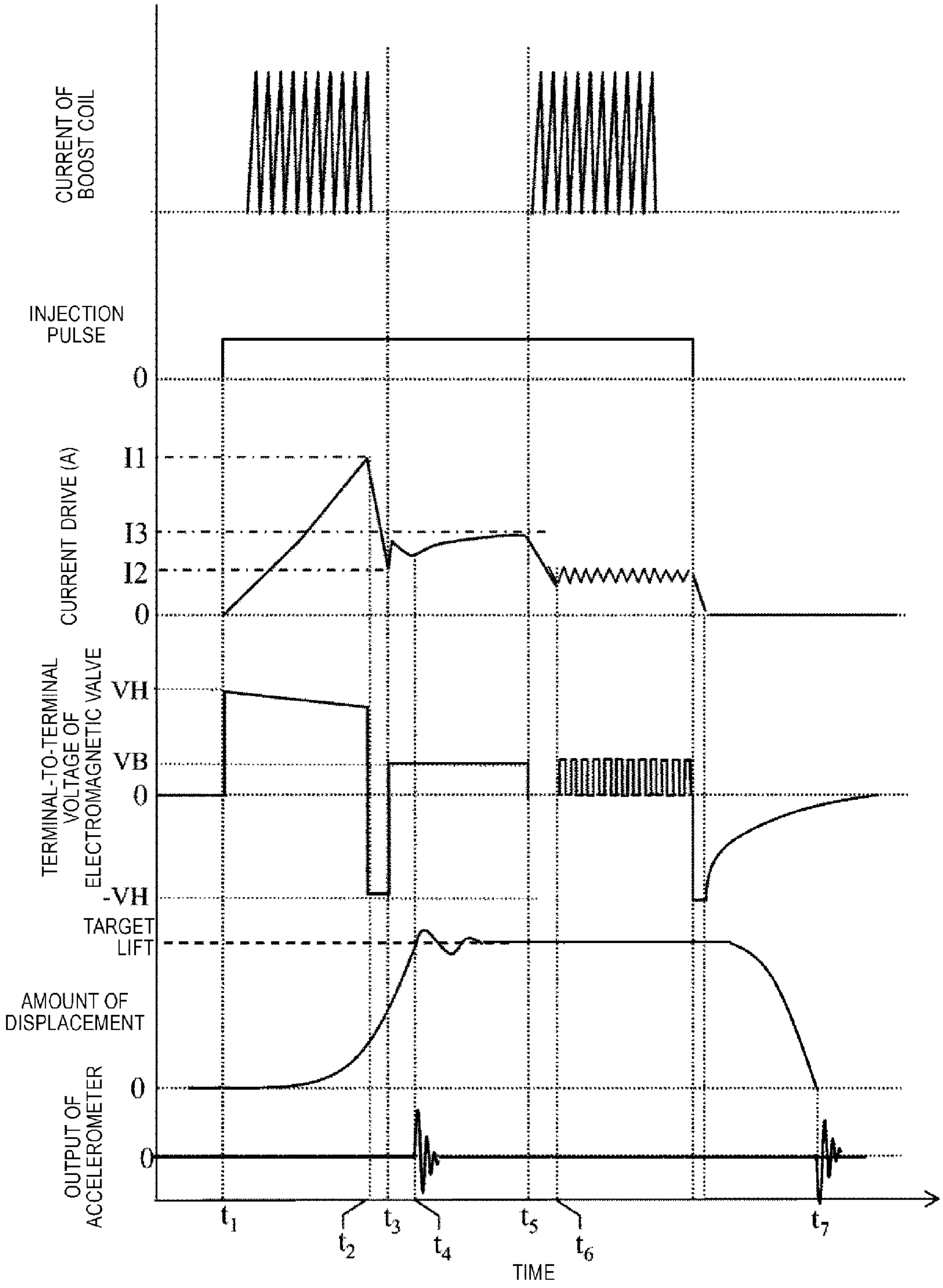
FIG. 10 illustrates operation waveforms for the electromagnetic valve in a sixth embodiment.

Hereinafter, a sixth embodiment of the present invention will be described in detail with reference to FIG. 10. FIG. 10 is equivalent to FIG. 7 in the third embodiment. The same reference signs are assigned to the same portions as those in the third embodiment, descriptions thereof are omitted, and hereinafter, only different portions will be described.

FIG. 10 is different in that a waveform for current flowing through the boost coil is added. During the period from t3 to t5, current does not flow through the boost coil, and a boost operation is stopped. The boost circuit 250 switches a large current of approximately 10 [A] to the boost FET 253 on and off at a high frequency, which is a cause of changes in the battery voltage VB or switching noise. The current of the electromagnetic valve is changed due to changes in the battery voltage VB during the period from t3 to t5, and thus it is necessary to prevent the changes in the battery voltage VB. Noise containing a high frequency component such as ringing during the switching operation is transmitted via parasitic capacitance of circuit elements, and is a cause of erroneous detection.

For this reason, as in the aforementioned embodiments, it is possible to more accurately detect the complete valve opening timing by stopping the operation of the boost circuit during the period from t3 to t5 for which the detection of the complete valve opening is performed.

Seventh Embodiment

Hereinafter, a seventh embodiment of the present invention will be described in detail with reference to FIGS. 11 and 12.

Figure 11:
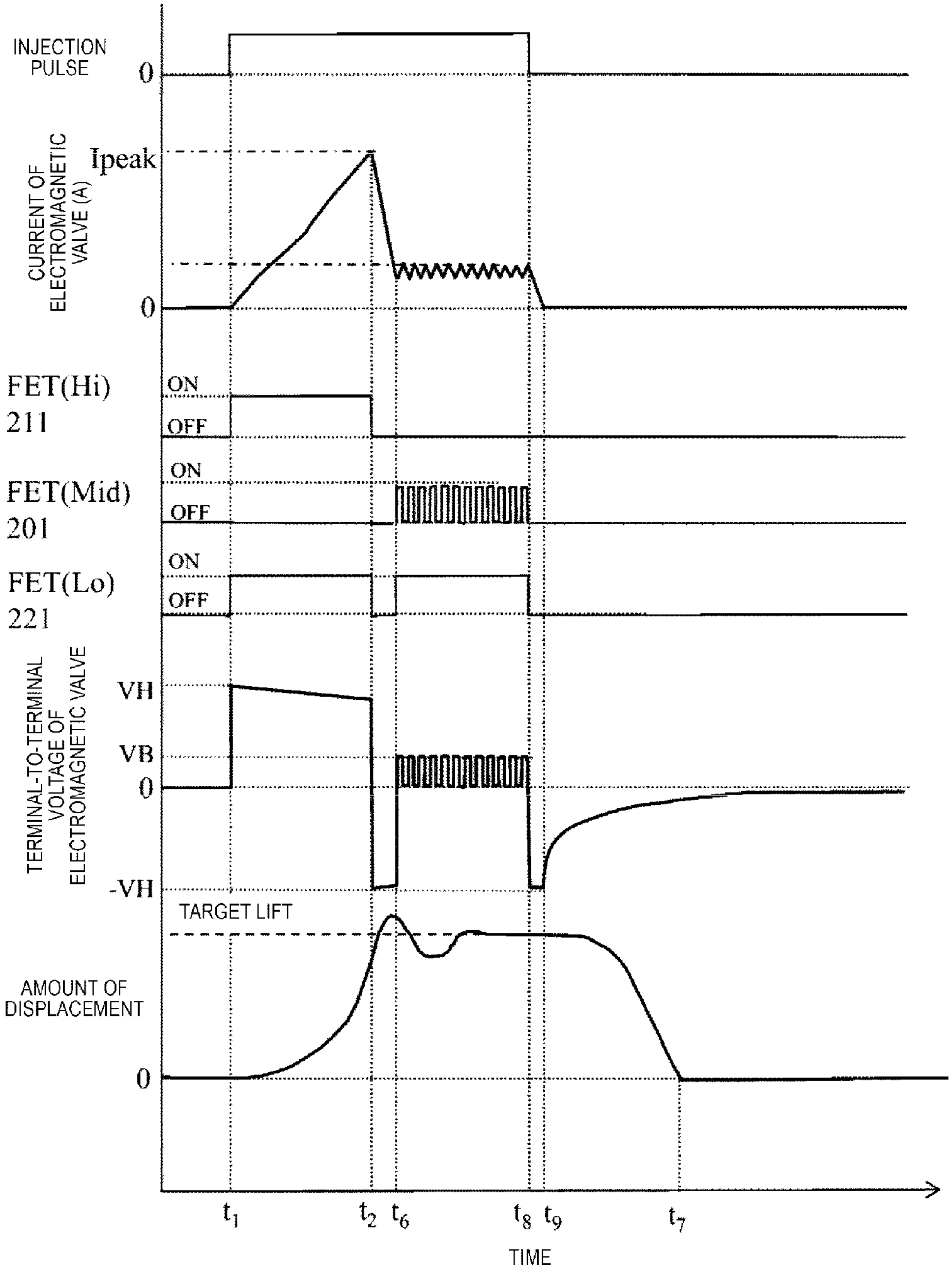

FIG. 11 is equivalent to FIG. 7 in the third embodiment. The same reference signs are assigned to the same portions as those in the third embodiment, descriptions thereof are omitted, and hereinafter, only different portions will be described.

The seventh embodiment is different in that the battery voltage VB is not applied during the period from t3 to t5 illustrated in FIG. 7, and the detection of the complete valve opening is not performed during this period. This mode is referred to as a normal drive mode. A detection drive mode refers to a mode in which the battery voltage VB is applied and the detection of the complete valve opening is performed during the period from t3 to t5 as in the first to sixth embodiments. In the normal drive mode, it is possible to freely set an injection pulse width without setting the period from t3 to t5, and thus it is possible to reduce an injection pulse compared to the detection drive mode, and to further reduce the minimum amount of injection.

Figure 12:
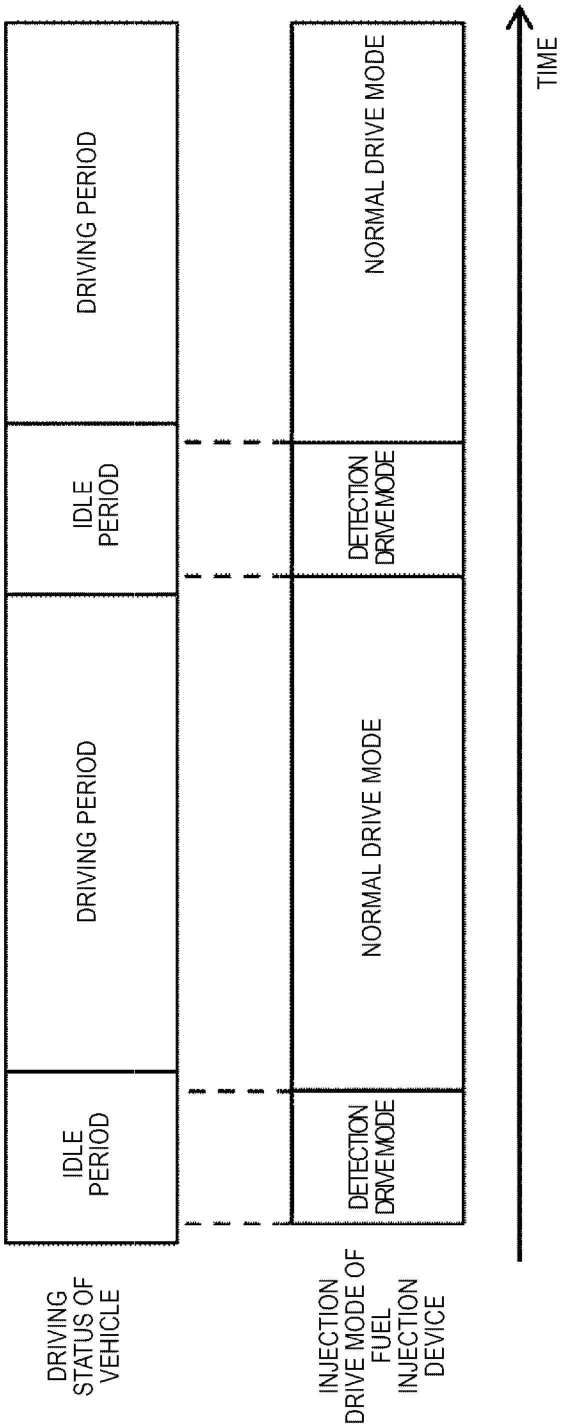
FIG. 12 is a table illustrating mode switching in the seventh embodiment.

FIG. 12 is a switching table illustrating operational statuses of a vehicle and injection drive modes of the fuel injection device. The detection drive mode is set within a partial period of an idle period of the vehicle, and the normal drive mode is set during the driving of the vehicle, and thus it is possible to improve fuel economy or to purify exhaust gas.

When the battery voltage VB is present in a predetermined voltage range, the detection drive mode is desirably performed, and it is possible to more accurately detect the complete valve opening in the detection drive mode.

When the fuel pressure is present in a predetermined pressure range, the detection drive mode is desirably performed, and it is possible to more accurately detect the complete valve opening in the detection drive mode. For example, the period for which the detection of the complete valve opening is performed may be set to be shorter than the cycle of changes in fuel pressure on an upstream side of the fuel injection device. In addition, the period for which the detection of the complete valve opening is performed is desirably set to be longer than a delay in the operation time of the movable core of the electromagnetic valve which is caused by the difference between the individual electromagnetic valves.

A load on in-vehicle equipment such as an air conditioner is desirably eliminated when the detection drive mode is performed, and thus it is possible to prevent changes in the battery voltage VB, and to more accurately detect the complete valve opening in the detection drive mode.

Detection information from the detection drive mode is reflected in the normal drive mode, and thus the value of $I_{peak}$ of the valve opening current may be changed. That is, $I_{peak}$ of the electronic valve with an early complete valve opening timing may be reduced, and $I_{peak}$ of the electromagnetic valve with a late complete valve opening timing may be increased such that the periods from the start of application of an injection pulse to the complete valve opening timing become equal. Accordingly, variations in the amount of injection between electromagnetic valves are reduced, and thus it is possible to improve fuel economy or to purify exhaust gas.

Eighth Embodiment

Hereinafter, a seventh embodiment of the present invention will be described in detail with reference to FIG. 13.

Figure 13:
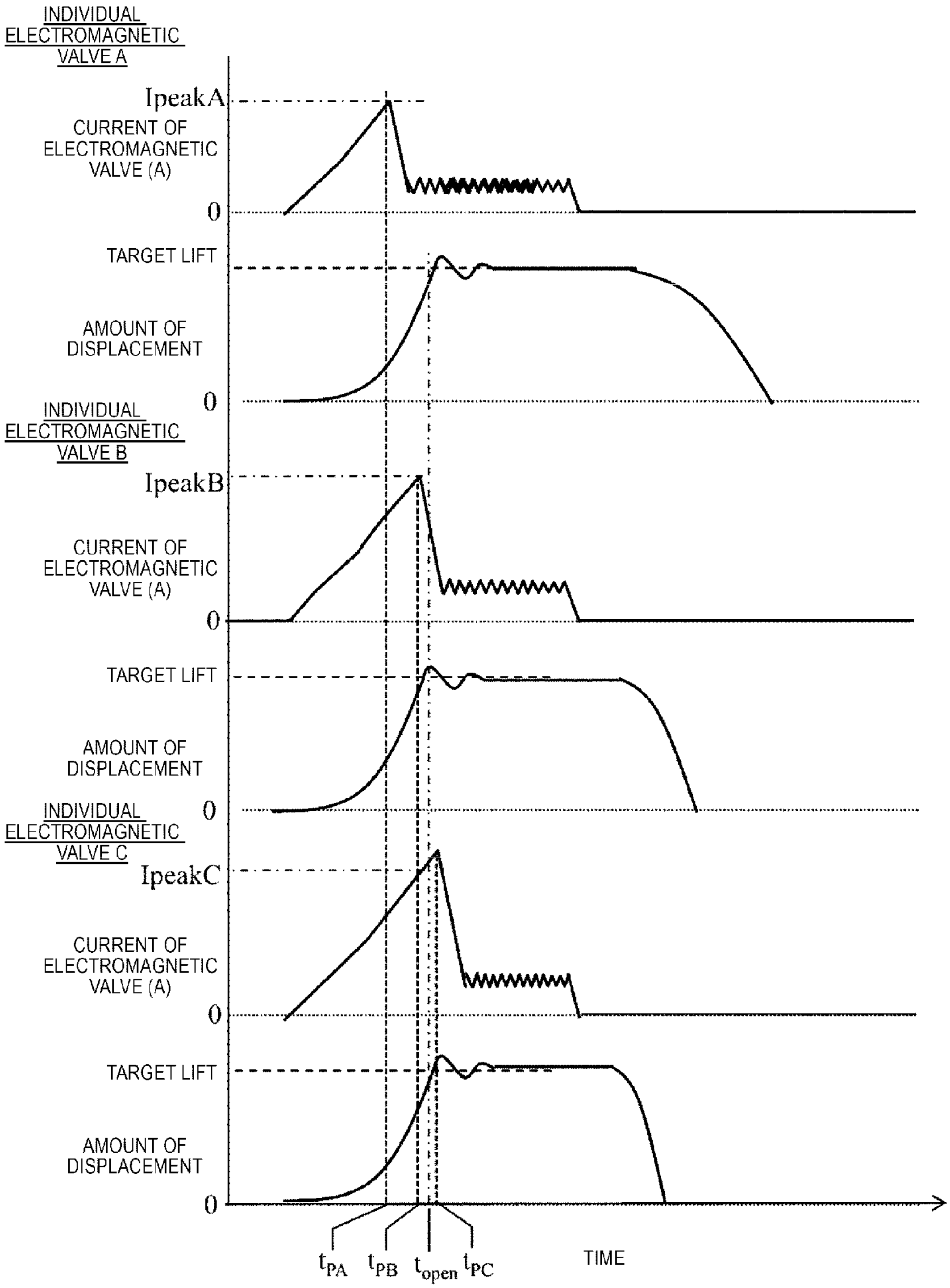
FIG. 13 illustrates operation waveforms for the electromagnetic valve in an eighth embodiment.

FIG. 13 illustrates a waveform for the current of the electromagnetic valve and the amount of displacement of the valve body for each of the individual electromagnetic valves A, B, and C in the normal drive mode. The individual electromagnetic valve A is an individual electromagnetic valve that has a weak spring force, and is easily opened, the individual electromagnetic valve B is an individual electromagnetic valve that has a medium spring force, and is easily normally opened, and the individual electromagnetic valve C is an individual electromagnetic valve that has a strong spring force, and is opened with difficulty. Since the valve opening timing for each individual electromagnetic valve is already known via the detection drive mode, it is possible to perform feedback control such as increasing the peak current of each individual electromagnetic valve, or correcting the injection pulse width thereof such that the valve opening timings for all the individual electromagnetic valves become the same time $t_{open}$. Specifically, a peak current of $I_{peak}$A is applied to the individual electromagnetic valve A at time tPA when the application of an injection pulse is started, a peak current of $I_{peak}$B greater than $I_{peak}$A is applied to the individual electromagnetic valve B at time tPB, and a peak current of $I_{peak}$C greater than $I_{peak}$B is applied to the individual electromagnetic valve C at time tPC. Accordingly, it is possible to set the complete valve opening timing for the individual electromagnetic valves A, B, and C to time $t_{open}$, and to reduce individual-to-individual variations. As a result, it is possible to obtain high accuracy in the amount of fuel injection.

Information regarding the valve opening timing for each individual fuel injection device obtained in the detection drive mode can be used not only in a case in which the fuel injection device is fully lifted such that the movable core comes into contact with the fixed core, but also in a case in which the amount of lift is set to a target amount of lift in which the movable core does not come into contact with the fixed core. In a medium lift range, even if the same injection pulse is supplied to the fuel injection device for each cylinder, the amounts of lift of the fuel injection devices are different due to the difference between the individual fuel injection devices caused by dimensional tolerances of the fuel injection devices, and thus individual-to-individual variations in the amount of injection are increased, and correction is desirably performed based on the information that is obtained in the detection drive mode.

REFERENCE SIGNS LIST

100: battery
200: electromagnetic valve drive circuit
300: electromagnetic valve
250: boost circuit
211: FET (Hi)
212: reverse flow protection diode (Hi)
213: shunt resistor (Hi) for current measurement
201: FET (Mid)
202: reverse flow protection diode (Mid)
203: shunt resistor (Mid) for current measurement
221: FET (Lo)
224: shunt resistor (Lo) for current measurement
223: freewheel diode
222: current-regenerative diode
251: input capacitor
252: boost coil
253: boost FET
254: boost chopper
255: output capacitor
230: IC
240: micro-computer
301: fixed core
302: spring
303: coil
304: movable core
305: valve body
306: nozzle holder

The invention claimed is:

1. A drive unit for a fuel injection device which applies a first voltage between both ends of the electromagnetic valve via the turning on of a first switching element, and applies a second voltage between both ends of the electromagnetic valve via the turning on of a second switching element with the second voltage lower than the first voltage, and thus drives an electromagnetic valve such that the electromagnetic valve is opened and closed, wherein when, after the first switching element is turned on, and energization current of the electromagnetic valve increases, the first switching element is turned off, the second switching element is turned on for a predetermined period, the electromagnetic valve is energized with a current lower than an energization current value which is increased by turning on of the first switching element, the second switching element is not turned off during the predetermined period, the electromagnetic valve is detected to have reached a target amount of control lift, and the electromagnetic valve is controlled in such a way that the timing to reach the target amount of control lift is present within the predetermined period.

2. The drive unit for a fuel injection device according to claim 1, wherein after the predetermined period has been elapsed, the electromagnetic valve with current which is lower than the energization current of the electromagnetic valve during the predetermined period is energized such that an open valve maintaining period is set for which valve opening of the electromagnetic valve is maintained.

3. The drive unit for a fuel injection device according to claim 1, further comprises:

a boost circuit that generates the first voltage by boosting the second voltage, wherein the operation of the boost circuit is stopped during the predetermined period.

4. The drive unit for a fuel injection device according to claim 1, wherein pulses turning on the second switching element are output to both ends of the electromagnetic valve more than two times, at least one pulse of the pulses is a detection pulse with a pulse width longer than those of the other pulses, and the electromagnetic valve is detected to have reached the target amount of control lift while the detection pulse is output.

5. The drive unit for a fuel injection device according to claim 1, wherein the detection pulse is an initial pulse during the period for which the electromagnetic valve is energized.

6. The drive unit for a fuel injection device according to claim 1, wherein after the first switching element is turned on, and the energization current of the electromagnetic valve increases to a first current value, a negative voltage is applied between both ends of the electromagnetic valve before the predetermined period.

7. The drive unit for a fuel injection device according to claim 1, wherein when the second switching element is turned on at 100% duty cycle, the electromagnetic valve is detected to have reached the target amount of control lift based on the energization current of the electromagnetic valve.

8. The drive unit for a fuel injection device according to claim 1, wherein during the predetermined period, a fuel pressure on an upstream side of the fuel injection device is present in a predetermined range, and the predetermined period is longer than a delay in an operation time of the electromagnetic valve caused by the difference between the individual electromagnetic valves.

9. The drive unit for a fuel injection device according to claim 1, wherein when the electromagnetic valve cannot be detected to have reached the target amount of control lift during the predetermined period, the first current value is reduced, and thus a start timing of the predetermined period is pulled ahead.

10. The drive unit for a fuel injection device according to claim 1, wherein when the electromagnetic valve cannot be detected to have reached the target amount of control lift during the predetermined period, the predetermined period is extended.

11. The drive unit for a fuel injection valve according to claim 1, wherein the energization current of the electromagnetic valve approximates to a value that is obtained by dividing the second voltage by electric resistance of the electromagnetic valve during at least a partial period of the predetermined period.

12. The drive unit for a fuel injection device according to claim 1, wherein the drive unit acts in a detection drive mode in which the predetermined period is provided, and in a drive mode in which the predetermined period is not provided and the electromagnetic valve is energized is provided, and the drive unit has a function of switching between the detection drive mode and the drive mode, and a function of correcting an energization waveform for the drive mode based on information detected in the detection drive mode.

13. The drive unit for a fuel injection device according to claim 12, wherein the detection drive mode is performed during at least a partial period of an idle period of an internal combustion engine.

14. The drive unit for a fuel injection device according to claim 1, wherein the drive unit has a function of monitoring a fuel pressure, and the detection drive mode is performed during at least a partial period of when the fuel pressure is present in the predetermined pressure range.

15. The drive unit for a fuel injection device according to claim 1, wherein the second voltage is a voltage supplied from an in-vehicle battery, and the detection drive mode is performed during at least a partial period of when changes in the voltage of the in-vehicle battery are present within a predetermined change width.

16. The drive unit for a fuel injection device according to claim 1, wherein a load causing changes in the voltage of the in-vehicle battery is eliminated during the period for the detection drive mode.

17. The drive unit for a fuel injection device according to claim 1, further comprises:

at least one circuit that differentiates signals containing information regarding the energization current of the electromagnetic valve of the fuel injection device.

18. A drive unit for a fuel injection device which applies a first voltage between both ends of the electromagnetic valve via the turning on of a first switching element, and applies a second voltage between both ends of the electromagnetic valve via the turning on of a second switching element with the second voltage lower than the first voltage, and thus drives an electromagnetic valve such that the electromagnetic valve is opened and closed, wherein when, after the first switching element is turned on, and energization current of the electromagnetic valve increases, the first switching element is turned off, the second switching element is turned on, the electromagnetic valve is energized with current lower than energization current value which is increased by turning on of the first switching element for a predetermined period, the second switching element is not turned off during the predetermined period, and the electromagnetic valve is detected to have reached a target amount of control lift, the electromagnetic valve is controlled in such a way that the timing to reach the target amount of control lift is present within the predetermined period, and when the electromagnetic valve cannot be detected to have reached the target amount of control lift during the predetermined period, the predetermined period is extended.

19. A drive unit for a fuel injection device which applies a first voltage between both ends of the electromagnetic valve via the turning on of a first switching element, and applies a second voltage between both ends of the electromagnetic valve via the turning on of a second switching element with the second voltage lower than the first voltage, and thus drives an electromagnetic valve such that the electromagnetic valve is opened and closed, wherein when, after the first switching element is turned on, and energization current of the electromagnetic valve increases, the first switching element is turned off, the second switching element is turned on, the electromagnetic valve is energized with current lower than energization current value which is increased by turning on of the first switching element for a predetermined period, the second switching element is not turned off during the predetermined period, and the electromagnetic valve is detected to have reached a target amount of control lift, the electromagnetic valve is controlled in such a way that the timing to reach the target amount of control lift is present within the predetermined period, and a load causing changes in the voltage of the in-vehicle battery is eliminated during the period for the detection drive mode.

* * * * *